United States Patent Office 2,839,532
Patented June 17, 1958

2,839,532
PYRIDAZONE COMPOUNDS AND PROCESS OF MAKING SAME

Jean Druey, Riehen, and Paul Schmidt, Therwil, Switzerland, assignors to Ciba Pharmaceutical Products, Inc., Summit, N. J.

No Drawing. Application April 26, 1954
Serial No. 425,738

Claims priority, application Switzerland April 30, 1953

13 Claims. (Cl. 260—250)

This invention relates to novel pyridazone compounds and a new and advantageous process for preparing the same.

It is already known to make certain pyridazone-(3)-compounds by reacting a saturated or unsaturated γ-keto-carboxylic acid with a hydrazine and, if necessary, oxidizing the resulting pyridazone. This process may be represented, for example, by the following scheme, in which R represents hydrogen or, for example, an alkyl group

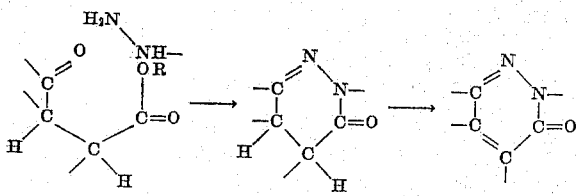

and the valances are satisfied by the other members in the starting compounds, which are not shown for the sake of brevity.

According to the process of the present invention a hydrazine which contains at least three hydrogen atoms attached to the nitrogen atoms is condensed with two components, namely (a) an organic α-dicarbonyl-compound, also commonly referable to as a 1,2-dioxo-compound, or a reactive functional carbonyl derivative thereof and (b) an organic carboxylic acid of which the carbon grouping in the α-position is a reactive methylene group or a reactive functional derivative of such acid, in optional sequence, i. e., directly or in stages, ring-closure being effected by using a basic condensing agent.

The new process is distinguished from the known procedure and possesses the advantage thereover in that it synthesizes the pyridazine ring from three simple bridge members and is therefore capable of extraordinarily wide variation with regard to the substituents. Furthermore, in most cases very good yields are obtained. The process may be represented, for example, schematically as follows:

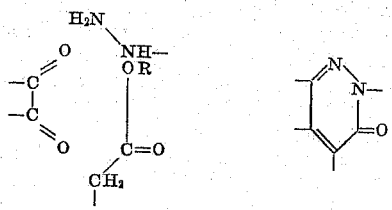

the valances being satisfied by the other members in the starting compounds, which are not shown for the sake of brevity.

As hydrazines there are used more especially hydrazine itself or, for example, monoalkyl-hydrazines such as methyl-hydrazine, monoaryl-hydrazines such as phenyl-hydrazines or monoheterocyclyl-hydrazines such as pyridyl-hydrazines, as such, or in the form of their salts.

Among organic α-dicarbonyl-compounds, also commonly referable to as a 1,2-dioxo-compound, there are to be understood α-diketones such as diacetyl, benzils or pyridils, α-keto-aldehydes such as alkyl- or aryl-glyoxals, for example, methyl- or phenyl-glyoxal, or glyoxal itself, and the reactive functional carbonyl derivatives thereof. Examples of reactive functional carbonyl derivatives are, for example, acetals, thioacetals, ketals, thioketals, acylates, bisulphite compounds or oximes. In the claims the term "compounds introducing the residue of an α-dicarbonyl compound" is intended to include both α-dicarbonyl-compounds and the reactive functional carbonyl derivatives thereof.

The organic carboxylic acids are advantageously reacted in the form of their reactive functional derivatives, especially their esters with lower alkanols. In the claims the term "compounds introducing the residue of an organic carboxylic acid" is intended to include both organic carboxylic acids and their reactive functional derivatives. It is of advantage to use those acid esters in which the α-methylene group is activated, for example, by a carbonyl, carboxyl or carbalkoxy or cyano group, for instance, acyl-acetic acid esters such as aceto- or benzoyl-acetic acid esters, cyano-acetic acid esters or malonic acid esters. Further suitable acid esters are, for example, aryl- or heterocyclyl-acetic acid esters such as phenyl-acetic acid esters or pyridyl-acetic acid esters, glycollic acid esters or acylamino-acetic acid esters, such as hippuric acid esters.

The reactions are carried out in the absence, but advantageously in the presence, of solvents at ordinary or raised temperature in an open or closed vessel under pressure. As basic condensing agents there are used more especially alkaline compounds, such as hydroxides, alcoholates, hydrides, amides or hydrocarbon compounds of alkali metals or alkaline earth metals, for example, those of sodium or potassium, or strong organic bases such as tertiary cyclic amines or quaternary ammonium hydroxides, for example, triethylamine or trimethyl-benzyl-ammonium hydroxide.

The process may be carried out in any optional sequence. Thus, for example, the process may be carried out in stages, for example, by first condensing the hydrazine with the organic α-dicarbonyl-compound or derivative thereof to form a monohydrazone. The latter is then reacted in a second stage with the carboxylic acid or derivative thereof to form the pyridazone-(3) compound, using a basic condensing agent. The condensing agent may be used immediately or after the formation of the corresponding acyl-hydrazones.

In another sequence of carrying out the process in stages a carboxylic acid hydrazide is first formed from the organic carboxylic acid described above and the hydrazine, and the product is condensed in a second stage with the dicarbonyl-compound or functional carbonyl derivative thereof, using a basic condensing agent. In this case also the condensing agent may be used immediately or after the formation of the acyl-hydrazones.

A third alternative is to carry out the reaction in the presence of all three reaction components and the basic condensing agent at the same time. Thus, for example, hydrazine may be reacted with cyanacetic acid ester and benzil in the presence of an alkaline condensing agent to form 4-cyano-5:6-diphenyl-pyridazone-(3) directly.

When compounds are obtained which contain a functionally converted carboxyl group, such as the cyano group or an esterified carboxyl group, such group may be converted by treatment with a hydrolysing agent into a free carboxyl group. If desired, a free carboxylic acid may be decarboxylated, for example, by the action of heat.

Furthermore a hydrogen atom bound to the ring nitrogen of a pyridazone so obtained may be replaced at any stage in the process by an organic residue, especially an alkyl group, advantageously by reaction with a reactive ester of an alcohol, such as a dialkyl sulphate or an alkyl halide.

When the compounds of the invention contain basic or acid groups, their salts with acids or bases can be prepared from them by treating with acids or bases in the usual manner.

The invention extends to any modification of the process in which there is used as starting material a compound obtainable as an intermediate product at any stage in the process, and the remaining steps of the process are carried out.

As illustrative of the compounds also embraced within the invention are the following:

Pyridazone-(3)-compounds having a cyano group in the 4-position. These compounds possess valuable pharmacological properties and can be used as medicaments, more particularly as analgesics. Especially valuable in this respect are compounds of the formula

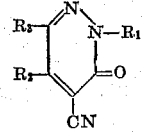

in which $R_1$, $R_2$ and $R_3$ represent hydrogen, phenyl or lower alkyl residues. For their analgestic effect there may be mentioned in the first place the 2,5,6-tri-lower alkyl-4-cyano-pyridazone-(3)-compounds, more especially 2,5,6-tri-methyl-4-cyano-pyridazone-(3). Compounds of the above formula, in which $R_2$ and $R_3$ form together a fused-on carbocyclic ring may also be mentioned.

Pyridazone-(3)-compounds of the formula

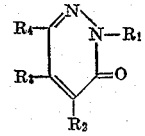

in which $R_1$ represents hydrogen, a phenyl or lower alkyl residue, $R_2$ stands for a free or esterified carboxyl group or an acetyl group, and in which $R_3$ and $R_4$ represent phenyl or lower alkyl residues or $R_3$ represents a lower alkyl residue or hydrogen and $R_4$ hydrogen. These compounds can be used as intermediate products for the preparation of the above mentioned nitriles by converting the substituents in 4-position into the cyano group by methods in themselves known, for example by conversion into the carbamyl group and then splitting off water. Compounds having the above formula can also be converted by methods in themselves known into the corresponding 4-amino-pyridazone-(3)-compounds, which are useful as analgestics, or anaesthetics.

Compounds of the formula

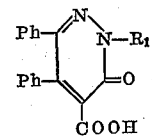

in which $R_1$ represents a phenyl or lower alykl residue and the symbols Ph stand for phenyl residues. These compounds are in addition valuable as solution promoters. They are excellent solution promoters for example, for medicaments of the pyrazolone series which are difficultly soluble or insoluble in water, such as 1-phenyl-2:3-dimethyl-4-dimethyl-amino-pyrazolone. The 2-methyl-4-carboxyl-5:6-diphenyl-pyridazone-(3) may be specially mentioned. Aqueous solutions of medicaments comprising these compounds can be made in the usual manner.

4,5,6-triphenyl-pyridazone-(3), 4-benzoyl-5:6-diphenyl-pyridazone-(3), 5,6-dimethyl-pyridazone-(3) and pyridazone-(3)-compounds having the formula

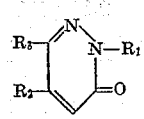

in which $R_1$, $R_2$ and $R_3$ represent phenyl or lower alkyl residues such as 2,5,6-triphenyl-pyridazone-(3). These compounds possess antibacterial properties and can be used as medicaments or disinfectants.

In the above description the lower alkyl residues represent for example ethyl, propyl, butyl, amyl, and more especially methyl residues; the phenyl residues represent for example unsubstituted phenyl residues or phenyl residues substituted e. g. by halogen atoms, lower alkyl or alkoxy groups; esterified carboxyl groups represent especially for example carbalkoxy groups having lower alkyl residues.

The new pharmacologically effective compounds of the above mentioned kind may be used as medicaments in the form of pharmaceutical preparations. These preparations comprise the new compounds or their salts together with a suitable pharmaceutical organic or inorganic carrier for enteral, parenteral or topical application which carrier consists advantageously at least partly of organic or solid inorganic matter. For the formation of the carrier there come into consideration such substances as do not react with the new compounds, such as for example water, gelatine, lactose, starch, magnesium stearate, talc, vegetable oils, benzyl alcohols, gum, polyalkylene glycols, vaseline, cholesterine, or other known medicinal carriers. The pharmaceutical preparations can be, for example, in the form of tablets, dragées, ointments, creams or in liquid form as solutions, suspensions or emulsions. If desired they may be sterilized and/or contain adjuvants, such as preservatives, stabilizers, wetting agents or emulsifying agents, salts to change the osmotic pressure or buffers. They may also contain other therapeutic valuable substances. Especially valuable are pharmaceutical preparations suitable for oral administration, for example tablets. These pharmaceutical preparations are prepared by methods in themselves known.

The following examples illustrate the invention, the parts being by weight unless otherwise stated, and the relationship of parts by weight to parts by volume being the same as that of the gram to the cubic centimeter:

*Example 1*

10 parts of benzil are introduced into 50 parts by volume of ethyl alcohol and mixed, while cooling with ice water, with 3 parts of hydrazine hydrate. In order to complete the reaction the mixture is heated for a further ½ hour at 60° C., then allowed to cool and filtered with suction to remove the precipitate. In this manner there is obtained the monohydrazone of benzil in the form of white crystals melting at 151° C.

10 parts of benzil monohydrazone and 10 parts of malonic acid diethyl ester are introduced into a sodium ethylate solution prepared from 2 parts of sodium and 200 parts by volume of ethyl alcohol, and the mixture is heated for 3 hours in a bath having a temperature of 90° C. The mixture is allowed to cool, a small amount of impurities is filtered off with suction, and the alcohol is evaporated under reduced pressure. The residue is dissolved in a small quantity of water, the solution is adjusted to a pH value of 5-6 by means of 2 N-hydrochloric acid, and the white precipitate is filtered off. After recrystallization from boiling benzene there is obtained 4-carbethoxy-5,6-diphenyl-pyridazone-(3) of the formula

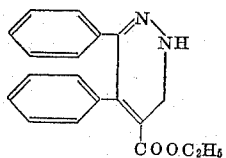

in the form of white crystals melting at 219–220° C.

*Example 2*

210 parts of benzil are dissolved in 700 parts by volume of ethyl alcohol and slowly mixed with 103 parts of phenyl-hydrazine. Yellowish crystals soon separate out, and are recrystallized from boiling ethyl alcohol. The resulting benzil monophenyl-hydrazone melts at 135° C.

30 parts of the monophenyl-hydrazone of benzil are heated with 20 parts of malonic acid diethyl ester and 2 parts of sodium alcoholate under reflux for 48 hours in a bath having a temperature of 160–170° C. In order to remove the excess of malonic ester the reaction mixture is extracted with 250 parts by volume of petroleum ether, and the undissolved residue is taken up in 200 parts by volume of boiling ethyl alcohol. Upon cooling, 4-carbethoxy-2,5,6-triphenyl-pyridazone-(3) of the formula

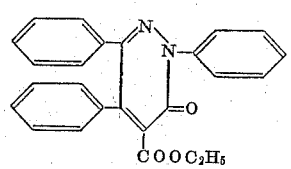

precipitates in the form of a yellow precipitate, which melts at 184° C. after being again recrystallized from boiling ethyl alcohol.

*Example 3*

23 parts of benzil monohydrazone and 16 parts of ethyl acetoacetate are added to a solution of 2.5 parts of sodium in 150 parts by volume of ethyl alcohol. The mixture is heated for 3 hours in a bath having a temperature of 90° C. then it is allowed to cool, filtered with suction to remove a small amount of impurities, and the filtrate is evaporated to dryness in vacuo. The residue is taken up in a small quantity of water, the solution is given a pH value of 5–6 by means of 2 N-hydrochloric acid, whereupon a yellow product precipitates which is recrystallized from boiling ethyl alcohol. In this manner there is obtained 4-acetyl-5,6-diphenyl-pyridazone-(3) of the formula

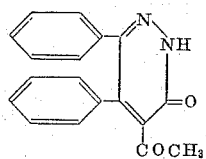

in the form of pale yellowish crystals melting at 232–233° C.

*Example 4*

2.5 parts of sodium are dissolved in 250 parts by volume of ethyl alcohol and when the formation of sodium alcoholate is complete, 23 parts of benzil monohydrazone and 24 parts of ethyl benzoyl-acetate are added. The mixture is then heated for 3 hours at a bath temperature of 90° C., and then allowed to cool, filtered and evaporated. The residue is taken up in a little water and the solution is adjusted to a pH value of 5–6. The yellow precipitate which separates out is crystallized from a small quantity of ethyl alcohol and there is obtained 4-benzoyl-5,6-diphenylpyridazone-(3) of the formula

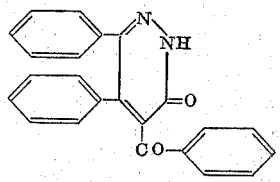

in the form of pale yellowish crystals melting at 224–225° C.

*Example 5*

1.25 parts of sodium are introduced into 200 parts by volume of ethyl alcohol. When all the sodium has reacted, 11.5 parts of benzil monohydrazone and 7 parts of ethyl cyanacetate are added, the whole is heated for 3 hours at a bath temperature of 90° C., then allowed to cool and filtered with suction in order to remove impurities which have separated out. The filtrate is evaporated to dryness in vacuo, the residue is taken up in a small amount of water and the solution is adjusted to a pH value of 5–6. The precipitate which separates out is recrystallized from ethyl alcohol. There is obtained 4-cyano-5,6-diphenyl-pyridazone-(3) of the formula

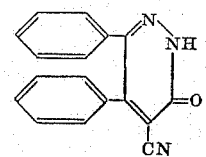

in the form of white crystals melting at 274–275° C.

*Example 6*

40 parts of hydrazine hydrate are introduced dropwise into a solution of 90 parts of methyl cyanacetate in 450 parts by volume of ethyl alcohol while cooling with ice water. The whole is allowed to stand for one hour at room temperature and then filtered with suction to separate the cyanacetic acid hydrazide which precipitates in the form of white crystals melting at 115° C.

22 parts of diacetyl are dissolved in 150 parts by volume of ethyl alcohol and slowly mixed with 24 parts of cyanacetic acid hydrazide, whereupon the solution heats up slightly and a white crystalline precipitate is soon formed. After 2 hours, the resulting diacetyl mono-cyanacetyl hydrazone of the formula

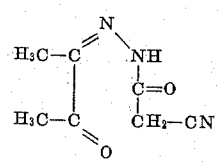

is separated by filtering with suction. The product melts at 133–134° C. after recrystallization from benzene.

2.5 parts of diacetylmono-cyanacetyl-hydrazone are introduced into a solution of 0.7 part of sodium in 50 parts by volume of ethyl alcohol, and the whole is heated for 3 hours at a bath temperature of 90° C. The mixture is filtered with suction while hot to remove impurities, the filtrate is evaporated, the residue is taken up in a small amount of water, and adjusted to a pH value of 5–6 with 2 N-hydrochloric acid. 4-cyano-5,6-dimethyl-pyridazone-(3) of the formula

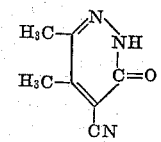

precipitates out, and is again recrystallized from ethyl alcohol. There are obtained white crystals melting at 211–212° C.

Example 7

30 parts of benzoyl-acetyl are dissolved in 200 parts by volume of ethyl alcohol and the solution is slowly mixed while cooling with ice water with 20 parts of cyanacetic acid hydrazide. The mixture is allowed to stand for 2 hours at room temperature and then filtered with suction to separate the white precipitate.

By recrystallization from boiling ethyl alcohol benzoyl-acetyl mono-cyanacetyl-hydrazone of the formula

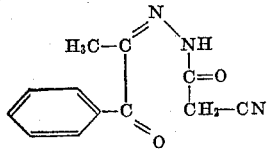

is obtained in the form of white crystals melting at 169–170° C.

22 parts of benzoyl-acetyl mono-cyanacetyl-hydrazone are added to a solution of sodium ethylate prepared from 2.3 parts of sodium and 300 parts by volume of ethyl alcohol, the mixture is allowed to stand for one hour at room temperature, and then heated for 3 hours at a bath temperature of 90° C. The whole is allowed to cool, evaporated to dryness, and the residue is taken up in a small amount of water and the solution given a pH value of 5-6 by means of 2 N-hydrochloric acid, whereupon a white precipitate is formed which is recrystallized from boiling ethyl alcohol. There is obtained 4-cyano-5-phenyl-6-methylpyridazone-(3) of the formula

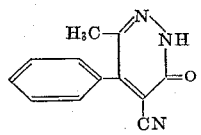

in the form of white crystals melting at 199–200° C.

Example 8

20 parts of benzil monohydrazone and 20 parts of ethylphenyl-acetate are added to a sodium ethylate solution prepared from 4 parts of sodium and 250 parts by volume of ethyl alcohol. The mixture is allowed to stand for one hour at room temperature, and is then heated for 3 hours at a bath temperature of 100° C. The whole is allowed to cool, then filtered with suction to remove impurities which precipitate, and the filtrate is evaporated to dryness in vacuo and the residue is taken up in water. The aqueous solution is given a pH value of 5–6 by means of 2 N-hydrochloric acid, whereupon a white crystalline precipitate is formed which is recrystallized from benzene. The resulting 4,5,6-triphenyl-pyridazone-(3) of the formula

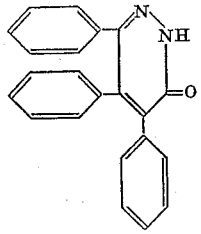

is obtained in the form of white crystals melting at 272–273° C.

Example 9

9 parts of benzil monohydrazone and 10 parts of ethyl hippurate are introduced into a solution of 1 part of sodium in 200 parts by volume of absolute ethyl alcohol. The mixture is then allowed to stand for one hour at room temperature, and is subsequently heated for three hours at a bath temperature of 90° C. After being cooled, the mixture is evaporated to dryness, the residue is extracted with water, and the solution is adjusted to a pH value of 5–6 with 2 N-hydrochloric acid. In this manner there is obtained a white precipitate which is recrystallized from benzene. The resulting 4-benzoylamino-5,6-diphenyl-pyridazone-(3) of the formula

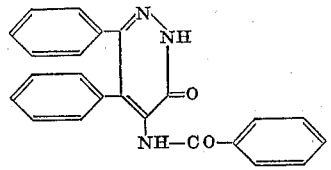

melts at 232–233° C.

Example 10

10 parts of benzil, 7 parts of ethyl cyanacetate and 2.4 parts of hydrazine hydrate are introduced into a solution of 1.3 parts of sodium in 100 parts by volume of anhydrous ethyl alcohol. The whole is stirred for one hour at room temperature, and is then heated for 3 hours at a bath temperature of 90° C. Impurities are then filtered off with suction, the filtrate is evaporated, the residue is dissolved in water, and the solution is given a pH value of 5–6 and filtered with suction to separate the white precipitate. After recrystallization from ethyl alcohol there is obtained a product melting at 274–275° C. which is identical with the 4-cyano-5,6-diphenyl-pyridazone-(3) obtained as described in Example 5.

Example 11

4 parts of hydrazine hydrate are introduced into a solution of 9 parts of ethylcyano-acetate in 100 parts by volume of anhydrous ethyl alcohol. There are then added 8 parts of diacetyl and a solution of 4 parts of sodium and 100 parts by volume of anyhydrous ethyl alcohol. The reaction mixture is heated for 4 hours while stirring well at 90° C. The mixture is then evaporated to dryness, the residue is taken up in 200 parts by volume of water, given a pH value of 6–7 with 2 N-hydrochloric acid, and filtered to remove the precipitate. By recrystallization from boiling ethyl alcohol there is obtained a product melting at 211–212° C., which is identical with the 4-cyano-5,6-dimethyl-pyridazone-(3) described in Example 6.

Example 12

2.3 parts of sodium, dissolved in 400 parts by volume of absolute ethyl alcohol, are heated with 20 parts of ethyl malonate and 29.3 parts of para:para'-dichloro-benzil monohydrazone for 4 hours at 90° C. while stirring. The mixture is evaporated to dryness, and the residue is dissolved in 800 parts by volume of a 1 N-solution of caustic soda. The solution is given a pH value of 6–7 with 2 N-hydrochloric acid, and the precipitate is filtered off with suction. By recrystallization from boiling ethyl alcohol there is obtained 5,6-di-(para-chlorophenyl)-4-carbethoxypyridazone-(3) of the formula

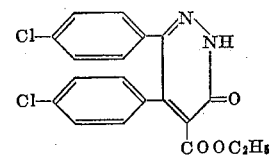

in the form of white crystals melting at 235–236° C.

Example 13

18 parts of 1:2-cyclohexanedione are dissolved in 200 parts by volume of absolute ethyl alcohol, then mixed with 13 parts of cyanoacetic acid hydrazide, stirred for 2 hours at room temperature, then a solution of 4 parts of sodium in 200 parts by volume of absolute ethyl alcohol is added, and the whole is heated at 90° C. for 3 hours. The reaction solution is evaported to dryness, the residue is taken up in 400 parts by volume of water, and the pH value is adjusted to 6–7 with 2 N-hydrochloric acid, whereby a yellow product is precipitated which is recrystallized from boiling ethyl alcohol. There is obtained in this manner 5,6-cyclohexano-4-cyano-pyridazone-(3) of the formula

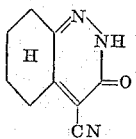

in the form of yellowish crystals melting at 240–241° C.

Example 14

10 parts of 9:10-phenanthrene-quinone are introduced into 500 parts by volume of absolute ethyl alcohol. The suspension is mixed with 4.8 parts of cyanoacetic acid hydrazide and 1 part by volume of piperidine, while stirring well, and the whole is heated for one hour at 90° C. A small amount of an undissolved precipitate is filtered off while hot. Upon cooling a yellow product precipitates, which is recrystallized from boiling ethyl alcohol. In this manner there is obtained 5:6-(9':10'-phenanthreno)-4-cyano-pyridazone-(3) of the formula

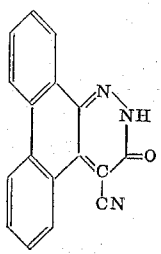

in the form of yellow crystals melting at 290° C. with decomposition.

Example 15

3 parts of 4-carbethoxy-5,6-diphenyl-pyridazone-(3) are heated with 100 parts by volume of 2 N-caustic soda solution at 110° C. for 2 hours in an oil bath. After cooling, the mixture is rendered acid to Congo with 10 N-hydrochloric acid, while cooling, whereupon a white precipitate is formed, which is recrystallized from a small amount of boiling ethyl alcohol. 4-carboxy-5,6-diphenyl-pyridazone-(3) of the formula

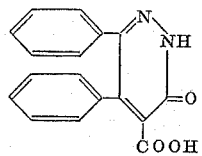

is thus obtained in the form of white crystals melting at 243–244° C. (with decarboxylation).

Example 16

10 parts of 4-carbethoxy-2,5,6-triphenyl-pyridazone-(3) are introduced into 250 parts by volume of a 2 N-solution of caustic soda, and the whole is heated for 12 hours at the boil. A small amount of undissolved starting material is filtered off with suction while hot, and the filtrate is evaporated to 100 parts by volume, whereby a white precipitate is formed, which is recrystallized from boiling ethyl alcohol. In this manner there is obtained the sodium salt of 4-caroxby-2,5,6-triphenyl-pyridazone-(3) of the formula

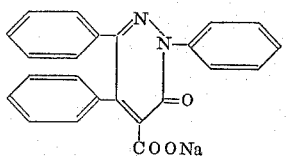

in the form of white crystals melting at 285–286° C. By dissolving the sodium salt in water and acidifying the solution with 2 N-hydrochloric acid, 4-carboxy-2,5,6-triphenyl-pyridazone-(3) melting at 248° C. (with decarboxylation) precipitates.

Example 17

1 part of 4-carboxy-2,5,6-triphenyl-pyridazone-(3) is heated in a flask over an open flame until the evolution of gas has ceased. The oily residue is crystallized from boiling ethyl alcohol, and there is obtained 2,5,6-triphenyl-pyridazone-(3) of the formula

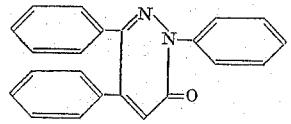

in the form of white crystals melting at 233–234° C.

Example 18

32 parts of 4-cyano-5,6-dimethyl-pyridazone-(3) are heated in 300 parts by volume of sulphuric acid of 90 percent strength at 150 C. (external temperature) for 12 hours. The reaction solution after being cooled is mixed with 700 parts of ice, and the mixture is adjusted to a pH value of 3 with a 10 N-solution of caustic soda, while cooling well. The mixture is then evaporated to dryness, and the residue is extracted with hot chloroform. The residue from the chloroform extract is recrystallized from a small amount of ethyl alcohol and in this manner 4-carboxy-5,6-dimethyl-pyridazone-(3) of the formula

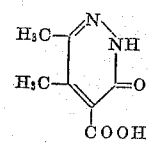

is obtained in the form of white crystals melting at 172–173° C.

Example 19

1 part of 4-carboxy-5,6-dimethyl-pyridazone-(3) is heated in an oil bath having a temperature of 200° C. After 10 minutes the evolution of carbon dioxide ceases, and the residue is solidified by cooling. By recrystallization from a small amount of ethyl alcohol there is obtained 5,6-dimethyl-pyridazone-(3) of the formula

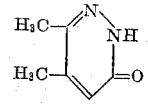

in the form of white crystals melting at 220–221° C.

Example 20

15 parts of 4-cyano-5,6-dimethyl-pyridazone-(3) are dissolved in 50 parts by volume of a 2 N-solution of caustic soda and slowly mixed in 3 portions with 13 parts of dimethyl sulphate, whereby a crystalline product precipitates, and the latter is filtered off with suction. By recrystallization from petroleum ether there is obtained 4-cyano-2,5,6-trimethyl-pyridazone-(3) of the formula

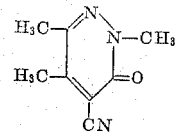

in the form of white crystals melting at 114–115° C.

Example 21

20 parts of 4-cyano-2,5,6-trimethyl-pyridazone-(3) are heated with 200 parts by volume of sulphuric acid of 90 percent for 12 hours in an oil bath having a temperature of 150° C. After cooling the mixture, it is poured on to 700 parts of ice, the pH value is adjusted to 3 while cooling, the mixture is evaporated to dryness and the residue is extracted with hot chloroform. The residue from the chloroform extract is recrystallized from a small amount of ethyl alcohol, whereby 4-carboxy-2,5,6-trimethyl-pyridazone-(3) of the formula

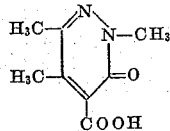

is obtained in the form of white crystals melting at 107–108° C.

Example 22

2 parts of 4-carboxy-2,5,6-trimethyl-pyridazone-(3) are heated for 10 minutes in an oil bath having a temperature of 220° C. After cooling the mixture, the residue is crystallized from a large quantity of petroleum ether, and there is obtained 2,5,6-trimethyl-pyridazone-(3) of the formula

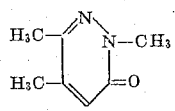

in the form of crystals melting at 92–93° C.

Example 23

16 parts of 4-carbethoxy-5,6-diphenyl-pyridazone-(3) dissolved in a mixture of 50 parts by volume of a 1 N-solution of caustic potash and 100 parts by volume of methanol, are slowly mixed with 5 parts by volume of dimethyl sulphate during which the solution heats up slightly. It is then heated at the boil for 30 minutes, the solution is evaporated in vacuo, and the residue is extracted by agitation with ether and water. After drying the extract over potassium carbonate and evaporating the ether, the residue is recrystallized from alcohol, and 2-methyl-4-carbethoxy-5,6-diphenyl-pyridazone-(3) of the formula

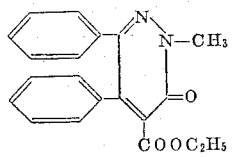

is obtained in the form of white crystals melting at 146–147° C.

Example 24

18.4 parts of 2-methyl-5,6-diphenyl-4-carbethoxy-pyridazone-(3) are boiled, under reflux, in a mixture of 120 parts by volume of 0.5 N-caustic soda solution and 240 parts by volume of alcohol for 3 hours. Upon cooling handsome needles are formed. The mixture is evaporated to dryness, the residue is dissolved in warm water and the solution is acidified with hydrochloric acid to such an extent as to turn Congo red. The precipitated 2-methyl-4-carboxy-2,5-diphenyl-pyridazone-(3) of the formula

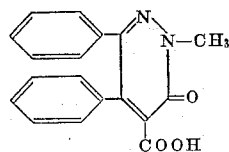

is recrystallized from alcohol and melts at 222° C.

It can for example be used as a solvent as follows:

10 parts of 1-phenyl-2,3-dimethyl-4-dimethylamino-pyrazclone and 10 parts of 2-methyl-4-carboxy-5,6-diphenyl-pyridazone-(3) are heated together with 80 parts by volume of water, whereby a solution is formed which remains clear after cooling.

Example 25

5.5 parts of 2-methyl-5,6-diphenyl-4-carboxy-pyridazone-(3) are slowly heated to 220–230° C. and maintained at that temperature for 30 minutes. The decarboxylation is then complete and the resulting 2-methyl-5,6-diphenyl-pyridazone-(3) of the formula

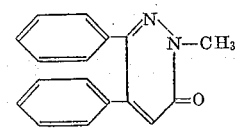

melts at 154–156° C.

Example 26

3.9 parts of 5,6-bis-(para-chlorophenyl)-4-carbethoxy-pyridazone-(3), dissolved in 10 parts by volume of a 1 N-solution of caustic potash and 20 parts by volume of methanol, are mixed with 1 part by volume of dimethyl sulphate, while hot and while stirring. The whole is boiled for a further 30 minutes, evaporated to dryness, the residue is extracted by agitation with ether and water, the ethereal extract is crystallized from alcohol, and there is obtained 2 - methyl - 5,6 - bis - (para-chlorophenyl) - 4 - carbethoxy-pyridazone-(3) of the formula

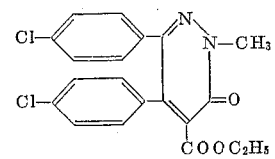

in the form of crystals melting at 169–170° C.

Example 27

8.8 parts of 4-cyano-5,6-diphenyl-pyridazone-(3), dissolved in a mixture of 32.2 parts by volume of a 1 N-solution of caustic potash and 100 parts by volume of water, are mixed dropwise with 5 parts by volume of dimethyl sulphate while hot and while stirring. There is immediately formed a dense yellow precipitate. The resulting 2-methyl-5,6-diphenyl-4-cyano-pyridazone-(3) of the formula

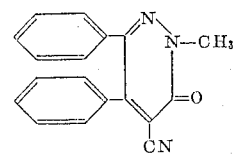

is isolated on a suction filter, and recrystallized from 500 parts of alcohol. It melts at 211–212° C.

Example 28

17 parts of 4-acetyl-5,6-diphenyl-pyridazone-(3), dissolved in a mixture of 60 parts by volume of a 1 N-solution of caustic potash and 200 parts by volume of water are mixed, while stirring in the warm, dropwise with 10 parts by volume of dimethyl sulphate. The mixture is then boiled for 30 minutes. The filter residue is recrystallized from alcohol, and in this manner there is obtained 2-methyl-5,6-diphenyl-4-acetyl-pyridazone-(3) of the formula

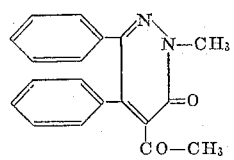

in crystals melting at 158–159° C.

Example 29

17.6 parts of 5,6-bis-(para-chlorophenyl)-4-carbethoxy-pyridazone-(3) are boiled for 6 hours with 300 parts by volume of a 1 N-solution of caustic soda. The solution is then given a pH value of 3 with dilute hydrochloric acid, and the precipitate so obtained is crystallized from dioxane of 50 percent strength. The resulting 5,6-bis-(para-chlorophenyl)-4-carboxy-pyridazone-(3) of the formula

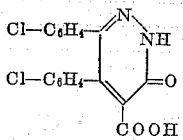

melts with decomposition at 274° C.

Example 30

1 part of 5,6-bis-(para-chlorophenyl)-4-carboxy-pyridazone-(3) is heated in an oil bath for 15 minutes at 275–285° C. The melt so obtained is recrystallized twice from a mixture, on each occasion, of 4 parts by volume of alcohol and 2 parts by volume of water. The resulting 5,6-bis-(para-chlorophenyl)-pyridazone-(3) of the formula

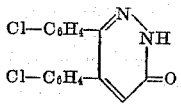

melts at 202° C.

Example 31

295 parts of glyoxal-sodium bisulfite are stirred in 1000 parts by volume of water and slowly mixed with a solution of 99 parts of cyanacetic acid hydrazide in 1000 parts by volume of ethyl alcohol. The mixture is rendered alkaline with 10 N-caustic soda solution and stirred for 2 hours, the solution becoming slightly warm. To complete the reaction the whole is stirred for another half hour at 60° C., adjusted to a pH value of 3 with hydrochloric acid and evaporated to dryness in vacuo. The residue is extracted with chloroform in a soxhlet apparatus. After evaporating the chloroform, the product is recrystallized from a little ethyl alcohol and there is obtained 4-cyano-pyridazone-(3) of the formula

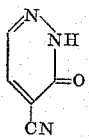

in the form of white crystals melting at 184–185° C.

Example 32

12.1 parts of 4-cyano-pyridazone-(3) are heated in 100 parts by volume of sulphuric acid of 85 percent strength for 8 hours at 140° C. After cooling, the reaction solution is poured on to 400 parts of ice and, while cooling well, adjusted to a pH value of 3 with 10 N-caustic soda solution. The whole is then evaporated to dryness and the residue extracted with hot chloroform. After evaporating the chloroform, the remaining product is recrystallized from a little boiling ethyl alcohol. There is thus obtained 4-carboxy-pyridazone-(3) of the formula

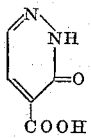

in the form of white crystals melting at 199–200° C.

Example 33

1.4 parts of 4-carboxy-pyridazone-(3) are heated in a distilling flask over an open flame, during which decarboxylation takes place and a liquid passes over which solidifies in the receiver. The product is crystallized from boiling ligroin and there is obtained pyridazone-(3) of the formula

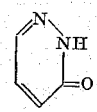

in the form of white crystals melting at 103–104° C. In the air the product takes up one mol of crystal water and the melting point drops to 70–73° C.

Example 34

12 parts of 4-cyano-pyridazone-(3) are dissolved in 50 parts by volume of 2 N-caustic soda solution and slowly mixed with 13 parts of dimethyl sulphate in three portions, whereby a crystalline product is precipitated which is filtered with suction. By recrystallization from ligroin there is obtained 2-methyl-4-cyano-pyridazone-(3) of the formula

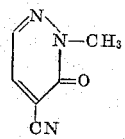

in the form of white crystals melting at 130–131° C.

Example 35

20 parts of 2-methyl-4-cyano-pyridazone-(3) are heated with 200 parts by volume of sulphuric acid of 85 percent strength for 12 hours in an oil bath at 150° C. After cooling, the whole is poured on to 700 parts of ice, adjusted to a pH value of 3 while cooling, evaporated to dryness and extracted with hot chloroform. The chloroform residue is recrystallized from a little ethyl alcohol, whereby 2-methyl-4-carboxy-pyridazone-(3) of the formula

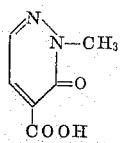

is obtained in the form of white crystals melting at 125–126° C.

Example 36

2 parts of 2-methyl-4-carboxy-pyridazone-(3) are heated in an oil bath at 240° C. for 10 minutes. After cooling, the residue is crystallized from petroleum ether and there is obtained 2-methyl-pyridazone-(3) of the formula

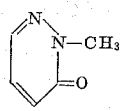

in the form of white deliquescent crystals melting at 38–39° C.

Example 37

15 parts of 4-cyano-5,6-dimethyl-pyridazone-(3) are dissolved in 50 parts by volume of 2 N-caustic soda solution and slowly mixed with 15 parts of diethyl sulphate in three portions. The whole is left to stand for one hour at room temperature and 15 parts by volume of 2 N-caustic soda solution are then added. After four hours the reaction solution is extracted with 300 parts by volume of chloroform and the chloroform residue distilled. At 140–142° C. under 0.1 mm. pressure of mercury 2-ethyl-4-cyano-5,6-dimethyl-pyridazone-(3) of the formula

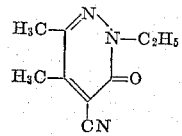

15 passes over and crystallizes in the receiver. The product is recrystallized from petroleum ether and obtained in the form of white crystals melting at 66–67° C.

Example 38

9 parts of 4-cyano-5-phenyl-6-methyl-pyridazone-(3) are dissolved in 22 parts by volume of 2 N-caustic soda solution and slowly mixed with 6 parts of dimethyl sulphate in three portions, whereby a crystalline product precipitates which is filtered with suction. By recrystallization from a little boiling ethyl alcohol there is obtained 2,6-dimethyl-4-cyano-5-phenyl-pyridazone-(3) of the formula

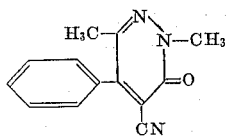

in the form of white crystals melting at 187–188° C.

Example 39

10 parts of 2 - methyl-5,6-bis-(para-chlorophenyl)-4-carbethoxy-pyridazone-(3) are boiled with 100 parts by volume of 0.5 N-caustic soda solution and 100 parts by volume of alcohol for 2 hours under reflux. The alcohol is then evaporated in vacuo, the concentrate diluted with warm water, the solution clarified by filtration and precipitated whilst still warm while stirring with dilute hydrochloric acid. The 2-methyl-5,6-bis-(para-chlorophenyl)-4-carboxy-pyridazone-(3) of the formula

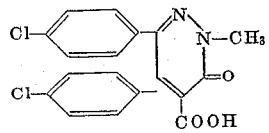

is filtered with suction and recrystallized from dilute alcohol. It melts at 241–242° C.

Example 40

6.34 parts of 5,6-bis-(para-chlorophenyl)-pyridazone-(3) are dissolved in 20 parts by volume of 1 N-caustic potash solution and 40 parts by volume of methanol. 2.4 parts by volume of dimethyl sulphate are introduced dropwise into the solution in the hot while stirring, and the whole is then heated for 15 minutes at the boil. The methanol is then evaporated and the residue extracted with water and ether. After drying and evaporating the ethereal solution, the 2 - methyl - 5,6 - bis - (para-chlorophenyl)-pyridazone-(3) of the formula

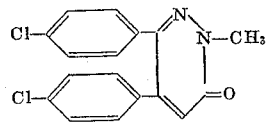

is distilled at 220° C. under 0.2 mm. pressure of mercury. After cooling, there is formed an amorphous white mass which cannot be obtained in a crystalline form from the usual solvents. The compound melts unsharply at about 75° C.

Example 41

5 parts of 2-methyl-5,6-bis-(para-chlorophenyl)-4-carboxy-pyridazone-(3) are decarboxylated by heating for 15 minutes at 250° C. The resulting 2-methyl-5,6-bis-(para-chlorophenyl)-pyridazone-(3) is purified by distillation as described in Example 40.

Example 42

The 2,5,6-trimethyl-4-cyano-pyridazone-(3) described in Example 20 can be made up in the usual manner as a pharmaceutical preparation of the following composition:

|  | Mg. |
|---|---|
| 2,5,6-trimethyl-4-cyano-pyridazone-(3) | 100 |
| Lactose | 65 |
| Gelatine | 2 |
| Starch | 65 |
| Magnesium stearate | 1 |
| Talcum | 17 |
|  | 250 |

Example 43

50 parts by volume of aqueous methyl glyoxal solution of 41 percent strength are mixed with 150 parts by volume of sodium hydrosulfite solution of 40 percent strength. To the resulting solution are then added 27 parts by weight of cyanoacetic acid hydrazide, the pH is adjusted to 9–10 with 10 N-caustic soda solution, and the solution heated to 70° C. for 1 hour, then allowed to cool and the pH adjusted to 4–5 with concentrated hydrochloric acid. The red solution is extracted by agitating with much warm chloroform several times and the chloroform solution evaporated. The residue is extracted with a small amount of boiling benzene, a portion dissolving readily and precipitating again on cooling after filtration. The precipitate is recrystallized several times from boiling benzene. There is obtained 4-cyano-6-methyl-pyridazone-(3) of the formula

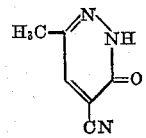

in the form of white crystals of melting point 166–167° C.

The portion which is sparingly soluble in benzene is recrystallized from ethyl alcohol to obtain 4-cyano-5-methyl-pyridazone-(3) of the formula

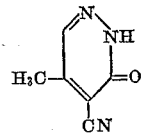

in the form of white crystals melting at 226–227° C.

We claim:

1. A process for the manfacture of pyridazone-(3) compounds, which comprises reacting a hydrazine which contains at least three hydrogen atoms attached to the nitrogen atoms, said hydrogen atoms being the only reactive groups of the hydrazine, with the two components (a) an α-dioxo compound selected from the group consisting of glyoxal, α-diketones and α-ketoaldehydes, the reactive groups of which being the two oxo groups, and bisulfite derivatives of said dioxo compounds, (b) a compound selected from the group consisting of an α-substituted acetic acid containing an α-methylene group, the only reactive grouping of which besides the carboxyl group being said α-methylene grouping, and lower alkyl esters thereof, the reaction being carried out in the presence of a basic condensing agent for ring closure.

2. A process according to claim 1, wherein all the reaction participants are simultaneously present in the reaction in substantially equimolecular amounts.

3. A process according to claim 1 wherein the hydrazine compound and the α-dioxo compound are reacted to form a monohydrazone, said monohydrazone being reacted with the α-substituted acetic acid compound.

4. A process according to claim 1, wherein the hydrazine compound and the α-substituted acetic acid compound are reacted to form a monohydrazide, said monohydrazide being reacted with the α-dioxo compound.

5. A process according to claim 1, wherein the α-substituted acetic acid compound is selected from the group consisting of α-carbonyl, α-carboxyl-, α-carbo-lower alkoxy- and α-cyano-acetic acid compound.

6. A process according to claim 1, wherein a cyano-acetic acid lower alkyl ester is used as the α-substituted acetic acid compound.

7. A process according to claim 6, wherein the reaction product is treated with a hydrolizing agent.

8. A process according to claim 1, wherein a carbo-lower alkoxy-acetic acid lower alkyl ester is used as the α-substituted acetic acid compound.

9. A process according to claim 8, wherein the reaction product is treated with a saponifying agent.

10. A process according to claim 1, in which a resulting N-unsubstituted pyridazone-(3) compound is treated with a reactive ester formed by an alkanol with a strong inorganic acid.

11. A 4-cyano-pyridazone-(3), being unsubstituted in 1-position and having in each of the 2-, 5- and 6-positions a member of the group consisting of hydrogen, lower alkyl, phenyl, halogeno-phenyl, lower alkyl-phenyl and lower alkoxy-phenyl.

12. 2,5,6-tri-lower alkyl-4-cyano-pyridazone-(3).

13. 2,5,6-trimethyl-4-cyano-pyridazone-(3).

References Cited in the file of this patent

Homer et al.: J. Chem. Soc. (London), 2191–2194 (1948).

King et al.: J. Am. Chem. Soc. 74, 3222–4 (1952).

UNITED STATES PATENT OFFICE

Certificate of Correction

Patent No. 2,839,532

June 17, 1958

Jean Druey et al.

It is hereby certified that error appears in the printed specification of the above numbered patent requiring correction and that the said Letters Patent should read as corrected below.

Column 1, line 21, for "pyridazone" read —pyridazinone—; column 3, line 56, for "analgestics" read —analgesics—; line 72, for "carboxyl" read —carboxy—; column 5, lines 3 to 9, the formula should appear as shown below instead of as in the patent—

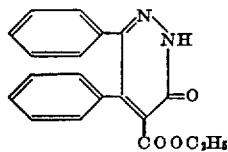

Signed and sealed this 4th day of November 1958.

[SEAL]

Attest:
KARL H. AXLINE,
*Attesting Officer.*

ROBERT C. WATSON,
*Commissioner of Patents.*